Feb. 19, 1963 C. B. SHORT 3,078,105
CARRIER ATTACHMENT FOR BICYCLES
Filed Dec. 11, 1961 2 Sheets-Sheet 1

Carroll B. Short
INVENTOR.

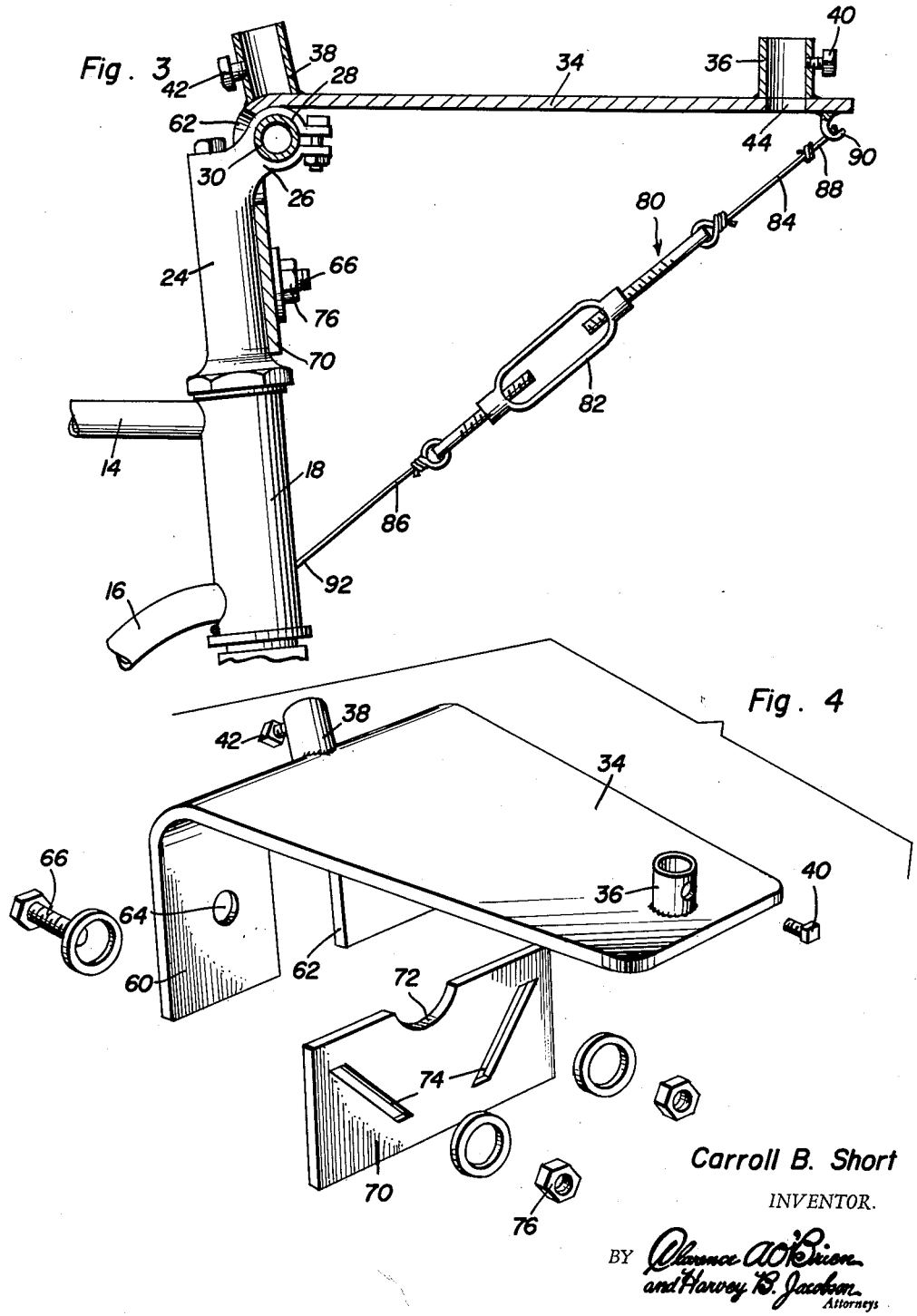

United States Patent Office 3,078,105
Patented Feb. 19, 1963

3,078,105
CARRIER ATTACHMENT FOR BICYCLES
Carroll B. Short, Vanderbilt, Tex.
(4709 Jean St., Corpus Christi, Tex.)
Filed Dec. 11, 1961, Ser. No. 158,375
8 Claims. (Cl. 280—202)

This invention comprises a novel and useful bicycle attachment and more particularly relates to a carrier adapted to be readily mounted upon the steering fork and spindle of a bicycle for supporting a platform forwardly of the steering bars and above the front wheel of the bicycle.

The primary object of this invention is to provide a carriage attachment for bicycles which shall provide a carriage or support body resting upon the handlebars and steering fork of the bicycle and projecting forwardly therefrom and above the front wheel.

A further object of the invention is to provide an attachment in accordance with the preceding objects which shall afford support for a seat and hand bars whereby children may be safely and comfortably carried by the rider of the bicycle in front of the rider.

A further object of the invention is to provide a bicycle attachment in accordance with the preceding objects which shall consist of a simple construction of platform having an improved means for mounting the same upon the steering fork assembly of the bicycle and for bracing the attachment to the bicycle in a greatly improved manner.

Yet another object of the invention is to provide a device in accordance with the preceding objects wherein an improved clamping means is provided whereby a horizontally extending platform may be detachably but securely mounted upon the handlebar and steering neck portions of the bicycle and may be braced from the tubular head of the bicycle frame, with the attachment being capable of turning with the steering fork of the bicycle and yet retain its secure bracing.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a side elevational view taken upon an enlarged scale and showing the front portion of the bicycle frame and the steering fork assembly with the attachment mounted thereon; and FIGURE 4 is an exploded perspective view of the carriage and clamping means of the attachment.

Figure 1:
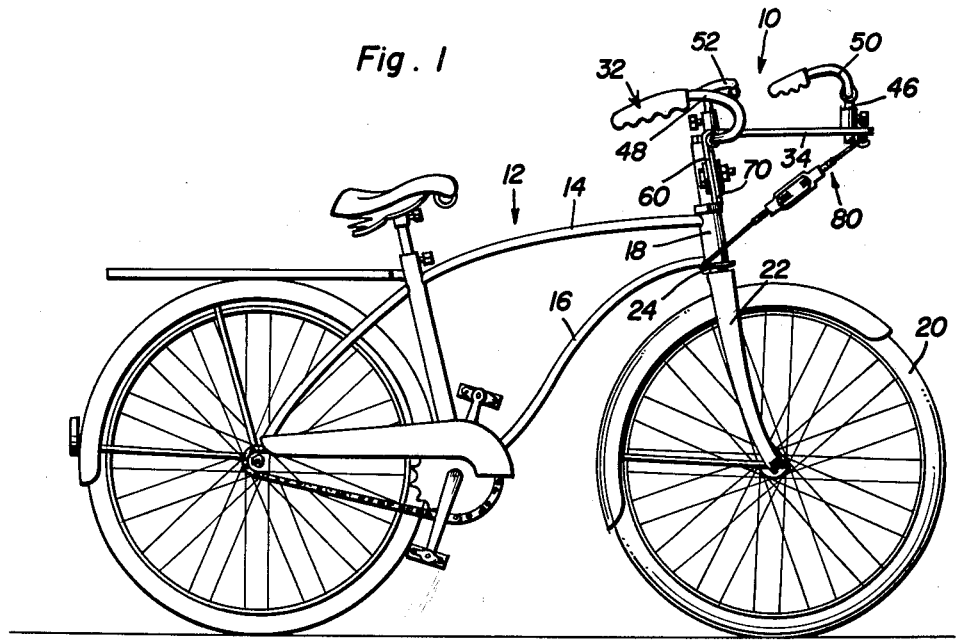
FIGURE 1 is a side elevational view of a bicycle showing the manner in which the attachment in accordance with this invention is mounted thereon.

In the accompanying drawings, the numeral 10 designates the bicycle attachment in accordance with this invention which is shown mounted upon a conventional type of bicycle indicated at 12. This bicycle has the usual frame including the longitudinally extending horizontal top and bottom frame members 14 and 16 respectively which at their front ends are joined by a tubular member 18 comprising the tubular head of the bicycle. The front or steering wheel 20 of the bicycle is journaled in the usual manner in a steering fork 22 which latter is provided with a steering neck or spindle 24 which is rotatably journaled in the tubular head 18 and projects upwardly thereabove. At its upward end, the steering neck 24 has a forwardly projecting portion 26 comprising a split clamp of conventional type and which has a transversely extending bore 28 in which is received the horizontally positioned crossbar 30 of the bicycle handlebar assembly 32.

As so far described, the bicycle construction is conventional and it is to this conventional construction that the attachment forming the subject matter of the present invention is adapted to be intimately and detachably associated.

The attachment 10 consists of a carriage or platform comprising a flat plate 34 extending generally horizontally and having its side edges rearwardly divergent with respect to each other from its front portion to its rear portion. Rising from the front and rear portions of the plate 34 are tubular bosses 36 and 38 provided with setscrews 40 and 42 respectively. Conveniently these bosses may be secured to the top surface of the plate as by welding or the like, with the forward boss 36 being perpendicular to the plate while the rearward boss 38 is preferably slightly inclined backward with respect thereto as shown in FIGURE 3. The plate itself is apertured as at 44 in alignment with the forward boss 36 to provide an opening therethrough. Received in the two bosses are the depending stems 46 and 48 respectively of a pair of hand bars 50 and a seat 52. By means of the setscrews 40 and 42 the hand bars and the seat may be vertically adjusted as desired in order to accommodate a child to be carried by the device.

At its rearward end, the plate 34 is provided with a downturned flange 60 which at its mid-portion is provided with an upwardly extending notch 62 therein. This flange is apertured as at 64 for the reception of fastening bolts 66 therethrough. Cooperating with the flange is a clamping means in the form of a flat clamping plate 70 which at its upper edge is likewise provided with a downwardly opening notch in the form of an arcuate recess 72, while the clamping plate is provided with a pair of relatively inclined slots 74 therein for the sliding reception of the bolt 66. The latter with the aid of fastening nuts 76 are employed to adjustably clamp the plate 70 to the flange 60 for a purpose to be subsequently apparent.

Referring now particularly to FIGURE 3 in conjunction with FIGURE 4 it will now be understood that when the attachment is applied to a bicycle, the rearward portion of the plate 34 rests upon and overlies the horizontal bar 30 of the handlebar of the bicycle while the flange 60 by means of its slot 62 straddles the projection 26 on the steering neck 24, with the face of the flange 60 thus bearing against the front surface of the steering neck 24. In this position, the clamping plate 70 is pressed upwardly so that its notch 72 engages the underside of the crossbar 30 or the projection 26 carrying the same and operates as a closure wall for the notch 62 so that the projection 26 is securely clamped therebetween. The inclination of the slot 74 enables the clamping plate 70 to be shifted or adjusted relative to the flange or plate 60 and thus causes the action of the cooperating slots 62 and 72 to firmly embrace and clamp the steering neck portion 26 therebetween.

It will be noted that in this arrangement the weight of the plate 34 of the carriage is thus supported both upon the top surface of the handlebar and against the front surface of the steering neck 24 by virtue of the engagement of the flange 60 against the latter.

Figure 2:
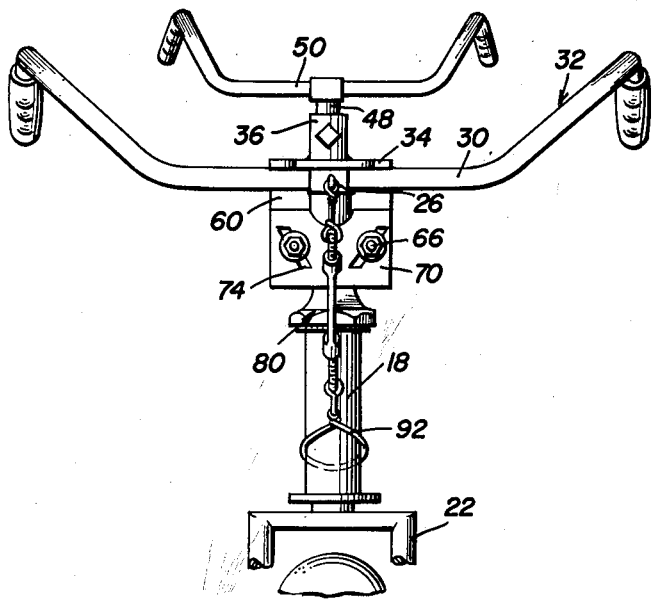
FIGURE 2 is a front elevational view of a portion of the steering fork assembly of the bicycle showing the attachment applied thereto.

A brace means is provided for securely retaining the carriage upon the bicycle. This brace means, indicated generally by the numeral 80 is a tension member which is longitudinally adjustable, including a turnbuckle 82 having at its opposite ends anchor members 84 and 86. The anchor member 84 is provided with a loop 88 adapted to be received on a depending hook 90 formed upon the underside of the front portion of the plate 34, while the member 86 likewise includes a loop 92 which as shown in FIGURE 2 embraces the lower portion of the tubular head 18 below the lower frame member 16 as will be apparent from FIGURE 3. The tension of the member 80 thus serves to bend or pull the forward end of the plate 34 downwardly about the fulcrum provided by the projection 26 of the steering neck and the handlebar crossbar 30 as will be apparent from FIGURE 2, the engagement of the flange 60 with the front face of the steering neck 24 resisting this movement and thus serving to securely retain the attachment in place.

By reason of the engagement of the loop 92 about the tubular head 18, relative turning movement at this point is possible without interfering with the tensioning and retaining of the device upon the bicycle.

The attachment of this invention when used without the seat and hand bars constitutes a very satisfactory carriage for supporting various articles as may be desired. Its primary purpose, however, is to provide a means which will enable children to be comfortably, enjoyably and safely carried by the rider of the bicycle in front of him and in a position where they are free of any danger of contact with the wheel 20 of the bicycle.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A bicycle attachment for use with a bicycle having a frame with a tubular head and a steering fork journaled in the latter and having a steering neck upon said fork projecting above said head and provided with handlebars, said attachment comprising a supporting carriage, means for mounting said carriage upon the steering neck and handlebars and forwardly of the latter and above the front wheel of the bicycle, said carriage comprising a flat horizontally extending platform, said mounting means comprising a depending mounting flange on the rear end of said platform, clamping means cooperating with said flange, said flange and clamping means embracing therebetween the steering neck of a bicycle, said flange having a downwardly opening notch to receive therein a portion of said steering neck, said platform adjacent said flange resting upon the top of the handlebars, said clamping means comprising a clamping plate having an upwardly opening notch cooperating with said flange notch to embrace said steering neck portion therebetween, and fastening means securing said clamping plate to said flange.

2. The combination of claim 1 wherein said fastening means comprises bolts carried by said flange and slidably received in slots in said clamping plate.

3. The combination of claim 2 wherein said slots are relatively inclined to each other.

4. A bicycle attachment for use with a bicycle having a frame with a tubular head and a steering fork journaled in the latter and having a steering neck upon said fork projecting above said head and provided with handlebars, said attachment comprising a supporting carriage, means for mounting said carriage upon the steering neck and handlebars and forwardly of the latter and above the front wheel of the bicycle, said carriage comprising a horizontally extending body having a depending portion at its rear end abutting the front surface of said steering neck, brace means secured to the underside of said body and to said tubular head and tensioning said body against said handlebars and steering neck, and fastening means for mounting said depending portion on said steering neck.

5. The combination of claim 4 wherein said brace means comprises a longitudinally adjustable tension member having one end secured to said tubular head and its other end attached to said body.

6. The combination of claim 5 wherein said one end of said tension member has a loop encircling said tubular head.

7. The structure according to claim 6 and in combination, a forward boss secured to and rising perpendicularly above the forward end of this body, additional handlebars provided with a depending stem, said boss being tubular and constituting a socket, and said stem being fitted and secured in said socket.

8. The structure defined in claim 7 and, in combination, a rearward boss tubular in cross-section and constituting a socket and attached to and rising from a rearward end portion of said body, and an auxiliary seat having a stem secured removably in said last-named socket.

References Cited in the file of this patent

UNITED STATES PATENTS

| 1,447,302 | Gugler | Mar. 6, 1923 |
| 2,321,752 | Kerr | June 15, 1943 |
| 2,725,922 | Smith | Dec. 6, 1955 |

FOREIGN PATENTS

| 599,657 | France | Oct. 23, 1925 |